J. A. PORTER.
METHOD AND APPARATUS FOR MIXING LIQUIDS.
APPLICATION FILED JULY 30, 1915.
1,202,421.
Patented Oct. 24, 1916.
2 SHEETS—SHEET 2.
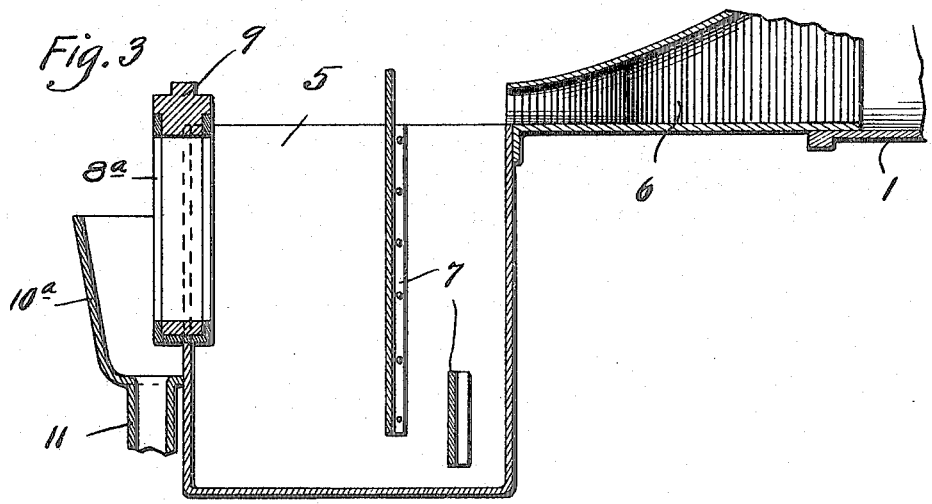
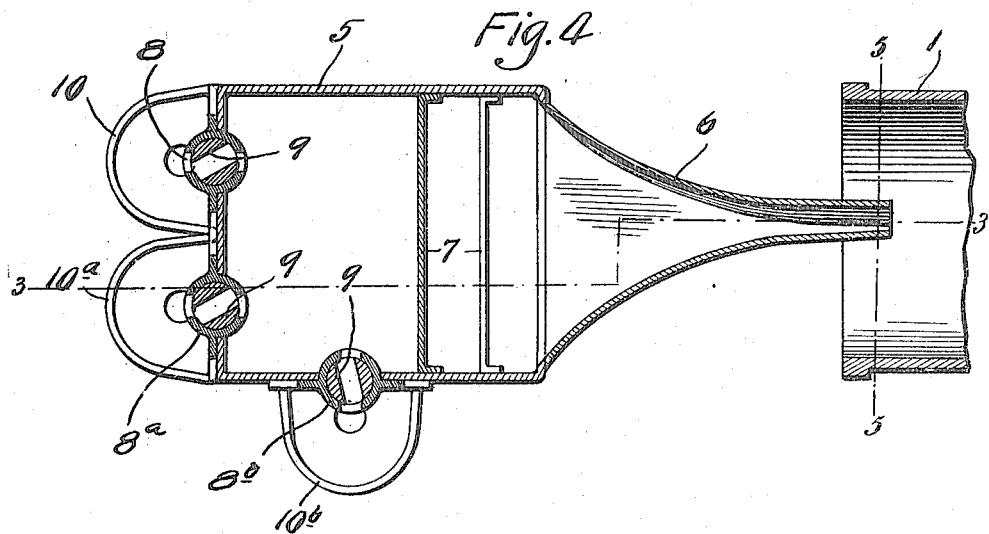
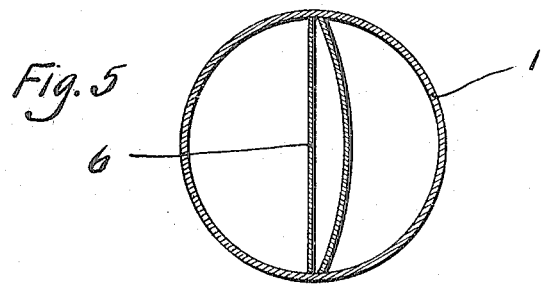
Inventor
John A. Porter
By F. R. Cornwall, Atty.

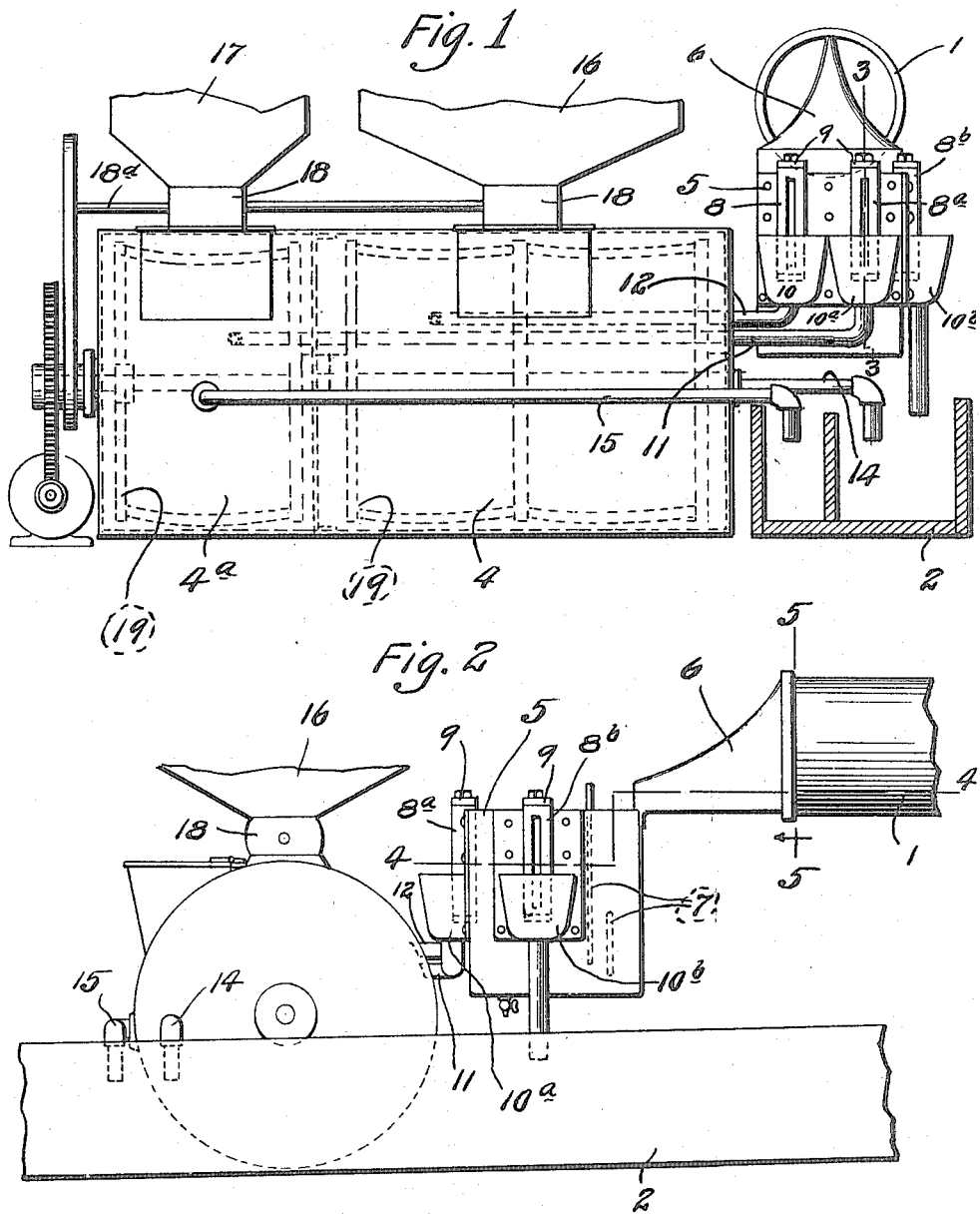

UNITED STATES PATENT OFFICE.

JOHN A. PORTER, OF ST. LOUIS, MISSOURI.

METHOD AND APPARATUS FOR MIXING LIQUIDS.

1,202,421.

Specification of Letters Patent.

Patented Oct. 24, 1916.

Application filed July 30, 1915. Serial No. 42,725.

*To all whom it may concern:*

Be it known that I, JOHN A. PORTER, a citizen of the United States, residing at St. Louis, Missouri, have invented a certain new and useful Improvement in Methods and Apparatus for Mixing Liquids, of which the following is a full, clear, and exact description, such as will enable others skilled in the art to which it appertains to make and use the same, reference being had to the accompanying drawings, forming part of this specification.

This invention relates to certain improvements in methods and apparatus used in connection with treating or purifying water, particularly in large systems, such as city water supply plants.

As is well known in the art, a very common method of purifying water consists in treating it with milk of lime and with some coagulant, such as sulfid of iron. Of course under different conditions, different kinds of chemicals are used, and as the herein described method and apparatus is designed for use with any sort of chemical, I will hereinafter use the term broadly. In treating water with chemicals, particularly water taken from running streams, the water is subject to great variations in the amount of material carried in suspension, the biological content, and in other particulars similarly dependent upon weather or other conditions. Similarly, the volume of water taken from a stream or natural supply is subject to considerable variation due to a number of factors. In the first place, in the case of streams, there is the question of pressure at the intake, more water being taken in with less power when the stream is at a high stage, than when it is at a low stage. Variations in the steam pressure at the pumping plant cause changes in the volume drawn in from hour to hour. Likewise other factors contribute to variations in the volume of the intake.

In the treatment of the crude water it is customary to employ some re-agent, such as milk of lime, for the purpose of counteracting certain chemical conditions in the water, and some coagulant, such as sulfid of iron, which operates to agglomerate the particles of solid matter held in suspension, and cause it to precipitate when the water is in settling tanks. Taking these two chemicals as typical, it is necessary of course to apportion the quantity of the chemicals used according to the volume of water and according to the condition of the water. The proper proportion of chemicals to each other and to unit volume of water is determined by tests which disclose the condition of the crude water from day to day. Obviously changes in the general condition of the water are not subject to such rapid and continuous variations as is the volume of water taken in, which latter, as above suggested, is subject to variation from a number of casual influences, such as hour to hour variation in steam pressure, or sudden intentional increase in pumping speed due to increase in demand, as from a fire. Thus it is possible to predetermine and fix the unit for unit proportion of chemicals relative to raw water with comparative ease. However, due to rapid and frequent variation in intake volume, it has proven difficult to mix the chemicals and raw water in the proper proportions consistently.

It is the purpose of my present invention to secure this result, *i. e.*—automatic feed of chemicals to the raw water in such fashion as to preserve the proper unit for unit proportion under all variations of intake volume. By "automatic", I mean to indicate that the variation in the feed of the chemicals, so as to maintain the proper unit for unit proportion, is effected by the variation in intake volume, and independently of any conscious regulation.

A further object of my invention is to facilitate the handling of the chemicals and the water so that they may be combined in the proper proportions without necessitating their being passed through any handling or measuring apparatus. This is a very important feature, as when the chemicals are mixed with the crude water, they become immediately active, and in the case of lime, rapidly produce calcious deposits, and in the case of a coagulant, produce other deposits, which deposits interfere greatly with the handling of the water, or the proper operation of any measuring or handling apparatus through which it is passed after having been mixed with the chemicals.

Other and further objects of my invention will be obvious, or pointed out hereinafter.

In the accompanying drawings, I have illustrated an apparatus embodying the structural features of my invention, and serving as a disclosure of means for practising the method which I claim.

In said drawings, Figure 1 represents a side elevation of my improved apparatus. Fig. 2 represents an end elevation showing the inlet pipe and the discharge conduit. Fig. 3 is an enlarged detail illustrating the selecting and apportioning apparatus, the same being in vertical section approximately on line 3—3 of Fig. 1. Fig. 4 is a horizontal section of the same taken approximately on line 4—4 of Figs. 2 and 4. Fig. 5 is a vertical section of the selecting conduit, the same being taken approximately on line 5—5 of Figs. 2 and 4. Fig. 6 illustrates a form of feeding mechanism, the same being a vertical section thereof.

As illustrated in these drawings, it will be understood that 1 represents an intake pipe leading from the source of supply, through any suitable pumping apparatus, or under a head of pressure. Through this intake pipe is introduced the crude water which is designed for treatment.

2 represents a discharge trough or conduit, the purpose of which is to convey away from the intake and from the selecting and mixing apparatus, the water after it has been combined with the chemicals.

4 and $4^a$ represent containers for the chemicals.

5 represents an apportioning chamber in the form of a tank or box into which water is led from the inlet pipe 1 by a selecting conduit 6.

The intake pipe 1, as illustrated, is round in cross section, although of course it may be in any other desired cross sectional form. The inlet pipe 1 is disposed so as to discharge into the trough or discharge conduit 2 and into the selector conduit 6. The selector conduit 6, as will be understood from Fig. 5, is arranged at the discharge end of the inlet pipe so as to take a certain small proportion of the water passed through the inlet pipe. The proportion of water taken by the selector pipe 6 remains constant, and hence it must vary in quantity with variations in the volume of the intake. Hence, in the form illustrated, the inlet pipe being round, I employ a selector having the irregular perimetrical contour at its mouth such as will cause it to take a constant proportion of the discharge from the round pipe. As illustrated, the selector conduit is drawn down so that it becomes broad and flat at its discharge end at the apportioning chamber 5. One or more baffles 7 are disposed in the apportioning chamber so as to break up any distinct current or eddies therein which might be occasioned by the continuous discharge into the chamber from the selector conduit. The apportioning chamber is provided with a plurality of gates, here illustrated as 8, $8^a$ and $8^b$, which gates are variable in size by suitable adjustable valves 9. Water will be discharged from the apportioning chamber through these respective gates in the ratio of their respective discharge areas. The volume of discharge through these gates individually and collectively is, of course, dependent upon the volume fed into the chamber by the selector conduit. Water discharged from these gates is taken by funnels 10, $10^a$ and $10^b$, respectively. As illustrated, the water discharged through gate $8^b$ is discharged or wasted into the discharge conduit 2. Water discharged from the apportioning chamber through gate $8^a$ is conducted by a pipe 11 to the container $4^a$ which, for the purpose of example, we will call the lime container. Water discharged through gate 8 is conducted through a pipe 12 to the container 4, which we will call the coagulant container. The proportion of water wasted, of water fed to the lime container, and of water fed to the coagulant container, is of course dependent upon the adjustment of gates 8. These gates, therefore, may be set so as to feed water to the lime and the coagulant containers in any desired proportion. With this arrangement it will be seen that I have, in the first place, by means of the selector conduit 6, a continuous selection of a constant proportion of the intake water. The volume of water in the apportioning chamber therefore, at a given period of time, represents in miniature the volume of water discharged from the intake pipe. If the condition of the water is such that it demands $x$ units of lime and $y$ units of coagulant per one-hundred units of water, the ratio of the discharge area of gates $8^a$ and 8 is set at the proportion of $x$ to $y$. The number of total units of chemical per unit of crude water is established by the ratio of the discharge area of gate 8 and $8^a$ to gate $8^b$. The greater the proportion of the chemical desired, the greater will be the discharge area of 8 and $8^a$ relative to $8^b$. Containers 4 and $4^a$ may be in the form of tanks, as illustrated, having inlet from pipes 12 and 11 respectively, and outlet into discharge conduit 2 by way of pipes 14 and 15 respectively. Containers 4 and $4^a$ are supplied with chemicals from suitable vats 16 and 17 by means of suitable feeding mechanism 18. This mechanism is arranged to feed the chemicals at a constant speed, although, of course the speed of the feeding mechanism may be varied to suit varying conditions of the water. An illustrative form of such feeding mechanism is shown in Fig. 6, wherein 16 may represent the vat, 4 the container, $18^a$ a casing which houses a revoluble cylinder or drum $18^b$ which is voluted to provide feeding pockets $18^c$. The rotation of drum $18^b$ by means of a shaft $18^d$ will effect the transfer of chemicals from vat 16 into container 4, the chemical being received into the pockets from the former and discharged into the latter in the course of revolution of the drum.

Mixers 19 are operated within the containers by suitable mechanism, performing the function of mixing the chemicals fed from vats 16 and 17 with the water introduced through pipes 11 and 12. Thus water fed into the containers from the apportioning chamber will be mixed with the chemicals, and will then flow out through pipes 14 and 15 carrying the chemicals into the crude water discharging through discharge conduit 2.

The arrangement of the chemical discharge pipes 14 and 15 is such that a continuous excess of water mixed with chemical is maintained in containers 4 and 4ª, and the feed of chemicals into the containers maintains a continuous excess or surfeit in the containers. Hence all water fed into the containers through pipes 11 and 12 will take up and carry out through pipes 14 and 15 a substantially uniform suspension of chemicals per unit of volume. As a result, an increase in the volume of water discharged through gates 8 and 8ª will accomplish a substantially proportionate increase in the feed of chemicals from the containers 4 and 4ª to the crude water in conduit 2.

As a result of the operation above described, it will be seen that variations in the volume of water discharged from the inlet 1 will occasion proportionate variations in the volume of chemicals supplied to the crude water. Hence the proportion of crude chemicals per unit of volume of crude water will be maintained constant. Furthermore, it will be observed that the ratio of chemicals to unit volume of water may be established or predetermined by adjustments affecting the ratio of discharge of gate 8ᵇ, which I will term the waste gate, to the discharge of gates 8 and 8ª, which may be termed the chemical gates. Hence it will be seen that I provide, in the first place, a means and method for automatically maintaining the proper proportion of chemicals to crude water; in the second place, a method and means for effecting the feed of chemicals to the crude water in the proper proportions; and in the third place, a method and means for establishing the desired proportion of chemical fed to the crude water.

As illustrated in Fig. 1, the discharge conduit 2 may be subdivided so as to maintain the crude water to which one of the chemicals has been fed separate from the crude water to which the other chemical has been fed. This will have the effect, in large measure, of preventing precipitation in the conduit. Of course as the water is fed into the settling basins, that from the respective compartments will be combined and mixed so that the entire body of water will be uniformly impregnated with both chemicals, whereupon the process of precipitation may proceed as desired.

I am aware, of course, that the apparatus and method above described may be employed with liquids and in places other than those specifically referred to. I am also aware that various changes and modifications may be made in the apparatus illustrated and described. Hence it is to be understood that the illustration and foregoing description are to be considered as illustrative rather than limiting.

I claim:

1. The method of continuously mixing external material with a liquid which consists in selecting a predetermined proportion of the liquid, said proportion being variable in volume with variations in the volume of the liquid, subdividing the proportion so selected, mixing the subdivisions so obtained with external materials in constant proportion and returning said subdivisions so mixed to the body of liquid from which the selected proportion was taken.

2. A mixing apparatus including means for diverting a constant predetermined portion of a supply stream, apportioning means for subdividing the volume of liquid so selected, means for supplying one or more of such subdivisions of said volume with a desired chemical in proportion to the volume of such subdivision, and means for conducting the entire selected volume with its chemical content back into the supply stream.

3. In an apparatus of the class described, the combination of a selector disposed to divert a constant predetermined proportion of liquid from a supply stream, an apportioning chamber to which the liquid so diverted is fed, said apportioning chamber being provided with discharge orifices adjustable as to size, a mixing container, means for conducting liquid from one of said discharge orifices to said container, means whereby a chemical may be mixed with liquid in said container, and means for conducting liquid with its chemical content from said container back into the supply stream.

4. In an apparatus of the class described, selector means for diverting a constant predetermined proportion of a supply stream, an apportioning chamber provided with means for selecting a predetermined proportion of liquid so diverted, a mixing container having a supply inlet from said apportioning chamber and a discharge outlet into the supply stream, said inlet and said outlet being normally open, and means for mixing a chemical with the liquid in said container.

5. In an apparatus of the class described, a selector means adapted to divert a constant predetermined portion from a continuously flowing supply stream, an apportioning chamber to which the liquid so diverted is continuously fed, said apportioning chamber being provided with means whereby a constant proportion of liquid is selected from the volume in said apportioning chamber, means for supplying a chemical to said last mentioned proportion of liquid, and means for returning said proportion with its chemical content to the supply stream in constant proportion thereto.

6. In a system of the class described, a constant flow mixing apparatus comprising the combination of means for continuously diverting a predetermined proportion of the supply stream, selectively variable means for constantly subdividing the volume so divided into proportionate parts, means for continuously supplying a chemical to one or more of said proportionate parts in constant proportion thereto, and means for continuously conducting the proportionate parts so treated back to the supply stream.

7. An apparatus of the class described, including in combination an open selector means for diverting a predetermined proportion of liquid from a continuous supply stream, variably adjustable normally open gates by which the diverted volume of liquid is subdivided, the discharge volume of said gates being dependent upon the volume supplied thereto by said selector means, means for continuously mixing a chemical with one or more of said subdivisions of the liquid, and means for continuously returning the liquid so treated to the supply stream.

In testimony whereof I hereunto affix my signature in the presence of two witnesses, this 17th day of July, 1915.

JNO. A. PORTER.

Witnesses:
  M. P. SMITH,
  LAURA MEYER.

Copies of this patent may be obtained for five cents each, by addressing the "Commissioner of Patents, Washington, D. C."